United States Patent [19]

Bain, Jr. et al.

[11] Patent Number: 4,829,425
[45] Date of Patent: May 9, 1989

[54] MEMORY-BASED INTERAGENT COMMUNICATION MECHANISM

[75] Inventors: William L. Bain, Jr., Beaverton; David G. Carson, Hillsboro; George W. Cox, Portland; Robert C. Duzett, Hillsboro; Brad W. Hosler, Portland, all of Oreg.; Scott A. Ogilvie, Salt Lake City, Utah; Craig B. Peterson, Portland; John L. Wipfli, Hillsboro, both of Oreg.

[73] Assignee: Intel Corporation, Santa Clara, Calif.

[21] Appl. No.: 168,635

[22] Filed: Mar. 1, 1988

Related U.S. Application Data

[63] Continuation of Ser. No. 921,313, Oct. 21, 1986, abandoned.

[51] Int. Cl.[4] .......................... G06F 9/40; G06F 9/00
[52] U.S. Cl. .................................................... 364/200
[58] Field of Search ................................ 364/200, 900

[56] References Cited

U.S. PATENT DOCUMENTS

| | | | |
|---|---|---|---|
| 4,286,322 | 8/1981 | Hoffman et al. | 364/200 |
| 4,318,173 | 3/1982 | Freedman et al. | 364/200 |
| 4,318,175 | 3/1982 | Hawley | 364/200 |
| 4,318,182 | 3/1982 | Bachman et al. | 364/200 |
| 4,320,451 | 3/1982 | Bachman et al. | 364/200 |
| 4,382,278 | 5/1983 | Appelt | 364/200 |
| 4,384,324 | 5/1983 | Kim et al. | 364/200 |
| 4,394,727 | 7/1983 | Hoffman et al. | 364/200 |
| 4,403,285 | 9/1983 | Kikuchi | 364/200 |
| 4,430,707 | 2/1984 | Kim | 364/200 |
| 4,449,182 | 5/1984 | Rubinson et al. | 364/200 |
| 4,463,420 | 7/1984 | Fletcher | 364/200 |
| 4,463,424 | 7/1984 | Mattson et al. | 364/200 |
| 4,466,065 | 8/1984 | Advani et al. | 364/300 |
| 4,475,156 | 10/1984 | Federico et al. | 364/300 |
| 4,493,020 | 1/1985 | Kim et al. | 364/200 |
| 4,564,901 | 1/1986 | Tomlinson et al. | 364/300 |
| 4,631,674 | 12/1986 | Blandy | 364/300 |

Primary Examiner—Gareth D. Shaw
Assistant Examiner—Viet Q. Nguyen
Attorney, Agent, or Firm—Owen L. Lamb

[57] ABSTRACT

An I/O processor for controlling data transfer between a local bus and an I/O bus. An Execution Unit, an I/O bus sequencer, and a local bus sequencer are connected to a register file. The register file is uniformly addressed and each of the Execution Unit, the local bus sequencer, and the I/O bus sequencer have read/write access to the register file. The register file is comprised of a plurality of register sets. The Execution Unit includes a programmed processor which is programmed to allocate the register sets among tasks running on the processor by passing register-set descriptors between the tasks in the form of messages. The local bus sequencer includes a packet-oriented multiprocessor bus, there being a variable number of bytes in each of the packets. The I/O sequencer includes logic for multibyte sequencing of data at a bus-dependent data rate between the I/O bus and the register file. Each of the tasks includes a task frame, each task frame including register-set pointers. The register-set pointers map between logical addresses used in the instructions of the tasks used to access the pointers and physical register-set addresses used to access the register. Programmed logic in each of the Execution Unit, the local bus sequencer, and the I/O bus sequencer dynamically allocate the register sets to the sending and destination tasks.

8 Claims, 4 Drawing Sheets

MEMORY-BASED INTERAGENT COMMUNICATION MECHANISM

This is a continuation of application Ser. No. 921,313 filed October 21, 1986, now abandoned.

CROSS-REFERENCES TO RELATED APPLICATIONS

Copending patent application Ser. No. 07/046,633 of Cox, et al, entitled "Programmable I/O Sequencer For Use In An I/O Processor" and assigned to Intel Corporation.

Copending patent application Ser. No. 06/942,608 of Cox, et al, entitled "Execution Unit With Multitasking Capability" and assigned to Intel Corporation.

BACKGROUND OF THE INVENTION

1. Technical Field

The present invention relates to data processing systems, and more particularly to apparatus for controlling data flow between an input/output bus and a general data processor bus.

2. Background Art

The basic input/output (I/O) problem is how to couple two different bus types, an input/output bus and a general data processor bus. On the I/O device side, different devices having a spectrum of data rates generated by different peripherals must be handled by the I/O bus. Some devices have the added problem of quiet periods followed by very busy periods with sharp transitions between the two. In the past this problem has been resolved by providing buffers.

An example of prior apparatus for controlling data flow between an input/output bus and a general data processor bus is the channel apparatus shown in the King, et al. patent, U.S. Pat. No. 3,550,133, granted to IBM on Dec. 22, 1970. In this IBM data channel, the central processing unit (CPU) initiates input/output operations by means of a start I/O instruction. This instruction addresses a particular channel and a particular I/O device. In response to this instruction, the channel fetches a channel address word (CAW) from a fixed location in main storage. The CAW contains the indirect address of the first channel command word (CCW) which is a control word specifying the type of command to be executed and the storage buffer area for data.

The channel program comprises a series of CCWs, which are utilized by the channel to direct the input/output operation. One CCW may control a block of information to be stored in a contiguous storage area. If several blocks of information are to be stored in the different areas, a list of CCWs is used, designating storage area blocks which are stored together by chaining the CCWs.

A drawback of this type of input/output control is that once a channel has been selected to perform a particular chaining operation, the channel is dedicated to that operation until it is completed. Therefore, the channel remains connected to the device even though there may be long latent periods between blocks of data specified by CCWs in the chain.

To overcome this drawback, a different approach was taken in the Clark, et al. U.S. Pat. No. 3,725,864, which was granted to IBM on Apr. 3, 1973. In the Clark, et al. patent, a plurality of channels are provided for scheduling and executing input/output programs. Each channel is capable of being logically connected to a device through a crosspoint switch. I/O tasks are then placed in a queue which is common to all of the channels. The channels then extract tasks from the queue and execute channel programs associated with the tasks. During latent periods of devices, channel programs corresponding to the device are queued to device queues. This enables the channel to go on to another task. When a device is at a point where its program can be resumed, any free channel which has access to the device will respond, reenter the program by extracting it from the device queue, and resume execution of the channel program.

An example of prior apparatus for buffering I/O data is the channel apparatus shown in the Capowski, et al. U.S. Pat. No. 3,699,530 granted to IBM on Oct. 17, 1972. In this apparatus, multiple dedicated buffers are provided for each channel to ensure that all channels have an individual receptacle for receiving data which cannot be made unavailable due to transfers by other channels. Prior resolution of requests from channels control the use of the bus from the channel independently of subsequent priority resolution for use of the main storage. Once a channel transfers its storage address and data into its assigned dedicated buffer, that buffer, based on the storage address contained within it, enters storage priority for the particular logical storage unit desired. In this manner, the single queue of channel requests is rearranged into four independent request queues based on logical storage addresses.

This approach has the advantage that it does smooth out input/output transfers, but at the expense of requiring dedicated resources which are expensive. In modern very large integrated (VLSI) technology, chip space is at a premium and pin connections are limited. It therefore becomes important to reduce the amount of buffering provided on the chip while still maintaining data throughput efficiency.

It is an object of the present invention to provide an input/output processor to handle transfers between a packet-oriented multiprocessor system bus and an input/output bus.

SUMMARY OF THE INVENTION

Briefly, the above object is accomplished in accordance with the invention by providing a processor bus sequencer, an I/O bus sequencer, and an execution unit, all of which operate asynchronously and share a common register file memory.

The I/O bus sequencer is connected to the I/O bus and to the register file memory. The register file is uniformly addressed and adapted to be shared by the execution unit, the system bus sequencer and the I/O bus sequencer. The register file is comprised of a plurality of multiported register sets. The execution unit includes a programmed processor having means for allocating the register sets among tasks running on the processor by passing register set descriptors between the tasks in the form of messages.

The local bus sequencer includes a packet oriented multiprocessor bus, there being a variable number of bytes in each of the packets. The I/O sequencer includes means for multibyte sequencing of data at a bus dependent data rate between the I/O bus and the register file.

Each of the tasks includes a task frame. Each task frame includes register set pointers, the pointers including means for mapping between logical addresses used in the instructions of the tasks used to access the pointers and physical register set addresses used to access the register. Means in each of the execution unit, the local bus sequencer and the I/O bus sequencer are provided for dynamically allocating the register sets to the sending and destination tasks.

The advantage of this approach is that given uniformly addressed registers, the servers sharing those resources save costs in the following ways. Servers can share a set of resources of aggregate size smaller than the sum of the sizes of the resource sets that would be required if they were privately held by each server.

The invention has the further advantage that information flow is reduced by passing information by reference rather than by value. Passing a register set pointer (a one-byte buffer index) is far faster than moving the whole 16-byte buffer. This saves code, time, and chip space.

DESCRIPTION OF THE DRAWINGS

The foregoing and other objects, features, and advantages of the invention will be apparent from the following more particular description of the preferred embodiments of the invention as illustrated in the accompanying drawings, wherein.

DESCRIPTION

Figure 1:
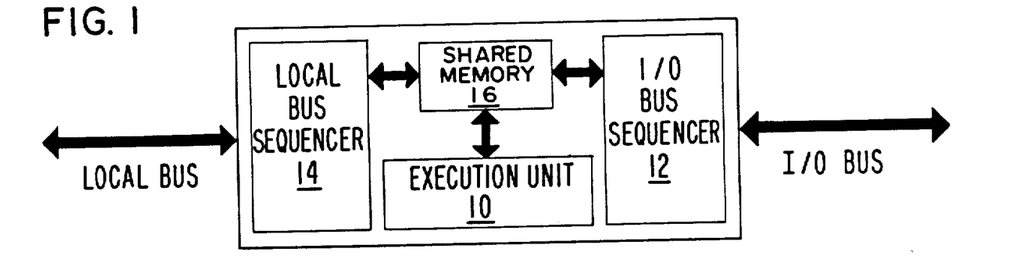
FIG. 1 is a functional block diagram illustrating each of the major components of the channel processor in which the present invention is embodied.

Refer to FIG. 1. The I/O Processor provides a coupling between a system bus referred to as the local bus and a variety of I/O buses. As an active agent on the Local bus, it executes channel commands and processes data buffers prepared by the computational subsystem. On the I/O side, it provides a 32-bit I/O bus and a set of bus control lines that can be programmed to support the signal level protocol for a large variety of parallel I/O buses.

The I/O processor in which the present invention is embodied has four distinct sections: the Execution Unit (EU-10), the I/O bus sequencer (IOS-12), the Local bus sequencer (14), and the register file shared memory (16).

Figure 2:
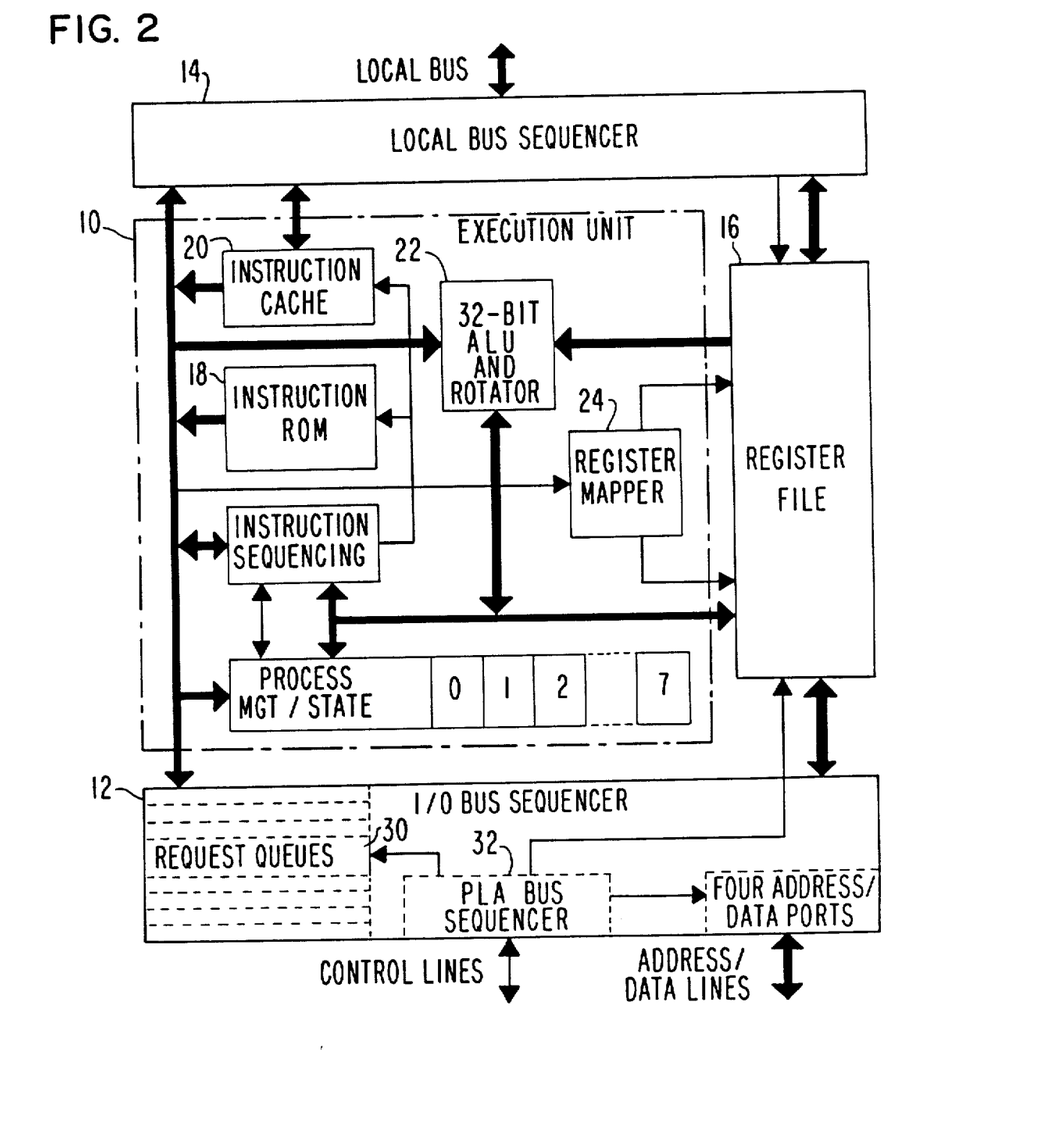
FIG. 2 is a more detailed block diagram of the system shown in FIG. 1.

Refer to FIG. 2. The EU (10) comprises four blocks; the instruction ROM (18), the instruction cache (20), the ALU (22), and the task frame registers including the register mapper (24). Microprograms running in the EU control the bus sequencers in order to move data across the chip through the register file (28).

The instruction ROM (18) contains 1.5K instructions. These instructions are always the first 1.5K instructions in the instruction address space. Other instructions are dynamicaly cached from memory on the Local bus to the instruction cache (20). The ALU (22) provides most of the arithmetic and functional capabilities of the EU. The task frame is a set of registers which contain hardware specific state information about the tasks on chip.

The I/O bus sequencer is more fully described in the above-identified copending patent application Ser. No. 07/046,633. It is made up of the I/O sequencer service table (30) and the I/O sequencer ROM PLA (32) shown in FIG. 1. The I/O service table contains a set of entries that control the actions of the IOS PLA, and provide for communication with the EU. The IOS PLA can be customized to meet the protocols of different external busses.

Refer again to FIG. 2. The Local bus sequencer (14) is the programmers path into the computational subsystem (CS) memory. Accesses to memory on the Local bus go through this interface. Also, communication with the Local bus is handled through this interface.

The register file (16) is a set of general purpose registers that are available to the programmer. There are 512 bytes of register space, organized into 16-byte groups known as register sets. Register sets can be dynamically allocated and deallocated to on-chip tasks as they are needed. The register file is a shared resource. The EU, I/O bus sequencer, and Local bus sequencer all access registers in the register file's pool of registers.

The I/O Processor has the functionality and the resources that make it well adapted to move data across it in either direction. Microprogrammers implement data transfers by programming the EU to manipulate the other three major resources on the chip (the Local bus sequencer, the I/O sequencer and the register file). Data moves through one of the sequencers to the register file, then moves from the register file to the other sequencer. While the data is in the register file, programmable transformations can also be performed on it, such as tagging/detagging or end-to-end validity checks.

In some applications it may be desirable to have each of those functions performed by a separate task; this organization of the microcode is known as pipelining. Register sets are passed from one task to another, or to one of the bus sequencers. A circular pipeline of tasks and sequencers is established. Multiple register sets "flow" around this pipeline, providing the data transfer mechanism. Pipelining exploits the EU's hardware support for inter-task synchronization, and results in very high data transfer rates.

Execution Unit

The execution unit (10) executes programs which manage the transfer of data across the I/O processor. It provides a multitasking abstraction to the programmer which simplifies the control of data transfers and background functions, such as interfacing to the computational and I/O subsystems. The following paragraphs describe the various facilities provided by the EU.

Address Spaces

The EU has five logical address spaces: the instruction space, a general register space, a computational system (CS) data space, an I/O space, and a local register space.

Instruction space

The EU's instruction space is 64k instructions. The lower 1.5K is in an on-chip ROM and contains the common subfunctions that make up the I/O Processor Kernel. The upper part extends from locations 1.5k to 64k and is dynamically cached from the CS memory. All tasks share the same 64k instruction space. Physically the I/O Processor has one fixed instruction area that is locked in CS memory. Code for all tasks must reside inside that area, which lies on a 4K byte boundary in the address space of the CS memory. The location of the fixed code is given to the I/O Processor by an initialization IAC (Inter-Agent Communication).

General register space

Each task can access up to 32 33-bit general registers (the 33rd bit is for tags) in its general register space. The space is organized into eight four-word groupings called register sets. Each register set is accessed indirectly through register set pointers. Data in the general register space can be manipulated as bytes, half-words (16bits) or words, and all data must be aligned on its natural boundaries.

CS data space

The computational subsystem (CS) data space can be up to four gigabytes long. The space is accessed via the Access instruction, which uses entries in the register file to build a physical address. The ACCESS instruction implements data transfers between general registers and CS memory.

I/O space

The address space on the I/O side of the I/O Processor is linearly addressable and can be up to sixteen megabytes long. It is also accessed using the Access instruction. This instruction uses registers in the register file, for address computation, and implements data transfers between general registers and I/O devices.

Local register space

The local address space provides access to several types of storage, including special I/O Processor registers that are not usually accessed by microcode, (e.g., the instruction cache's address table entry) and otherwise inaccessible I/O Processor storage areas (e.g., the task frame registers).

Registers in the local address space are accessed using the access local instruction.

Register File

The I/O Processor has a set of on-chip general purpose registers contained in the register file (16). The register file is a RAM containing 128 33-bit locations. These 128 registers are organized as 32 4-word register sets.

These register sets, and the data within them, are accessed indirectly through the register set pointers of each task. Registers are therefore addressed logically rather than physically. Register addresses are specified to byte granularity where appropriate. Instructions assume that half-word and word operands are located on appropriate boundaries.

Register set pointers

Figure 3:
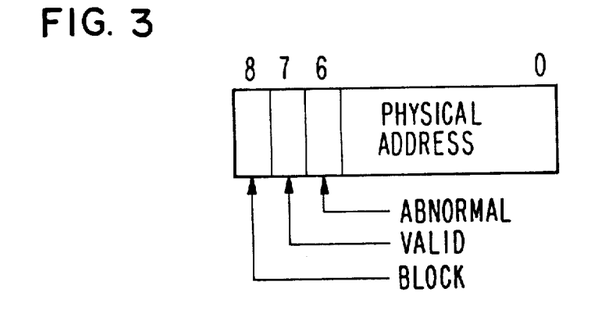
FIG. 3 is a diagram of a register set pointer.
Figure 4:
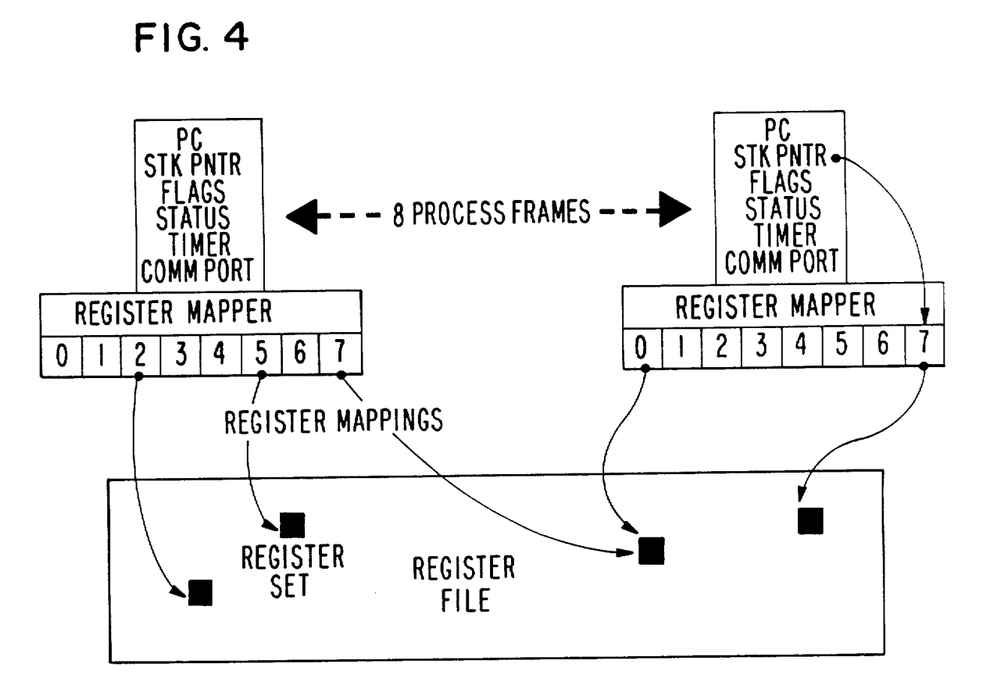
FIG. 4 is a diagram illustrating the operation of the register mapper and shared register file.

Register set pointers (FIG. 3) provide the mechanism for mapping between logical addresses (that are used in the instructions) and physical register set addresses. FIG. 4 illustrates the mapping of eight resident process frames corresponding to the eight tasks into the register sets in the register file. There are 32 register sets, and 16 bytes per register set. Each process addresses registers through the register mapper. This allows run-time register allocation. A maximum of eight register sets are mappable to each process, and each register set can be mapped to more than one process or sequencer. In this manner, the register file provides the basis of hardware synchronization between the execution unit and the two bus sequencers.

Each task has eight register set pointers. These pointers are accessible in the local space. The bottom six bits contain the physical address of a register set in the register file. The top three bits are used for access control.

The Abnormal bit gets set when a sequencer has had a problem operating on a register set. For example, if the Local bus sequencer is supposed to load a register set with 16 bytes and for some reason can only put 9 in it, the sequencer will set the 'abnormal' bit before passing the register set to the destination task. If a task tries to access a register set whose 'abnormal' bit is set, then the hardware will raise a context level fault. The Valid bit tells whether the register set pointer contains a valid address and is also used in an exclusion mechanism that is described below. The Block bit is set when a task tries to access a register set whose valid bit is not set. This bit tells the hardware which register set the task is blocked on. When the pointer is updated and the valid bit is set, the task will be unblocked if the block bit for that register set is set.

The Move Pointer instruction allows register set pointers to be loaded and stored. This instruction is used primarily when doing message based register set passing.

Register set locking

Any task that tries to access a register set through a register set pointer whose valid bit is reset will block. This mechanism is provided to control access to register sets for tasks that are passing the register sets between themselves or to and from the bus sequencers.

Valid bits are set and reset by instructions that logically pass a register set from one task to another or by synchronization with the bus sequencers. The sending task's register set pointer valid bit is reset, and the destination task's register set pointer valid bit is set.

Tasks

EU code is organized into a set of logically concurrent tasks. The EU supports eight resident tasks and multi-plexes their execution. It also provides inter-task synchronization and message passing instructions. This hardware support assures fast context switching and inter-task synchronization.

Task Frames

Each I/O Processor task has hardware specific state information associated with it, such as the program counter, stack pointer, flags, etc. This state information is called a task frame. Each task frame (FIG. 5) is composed of task frame registers and register set pointers. The task frame registers contain most of the state information associated with a task.

Figure 5:
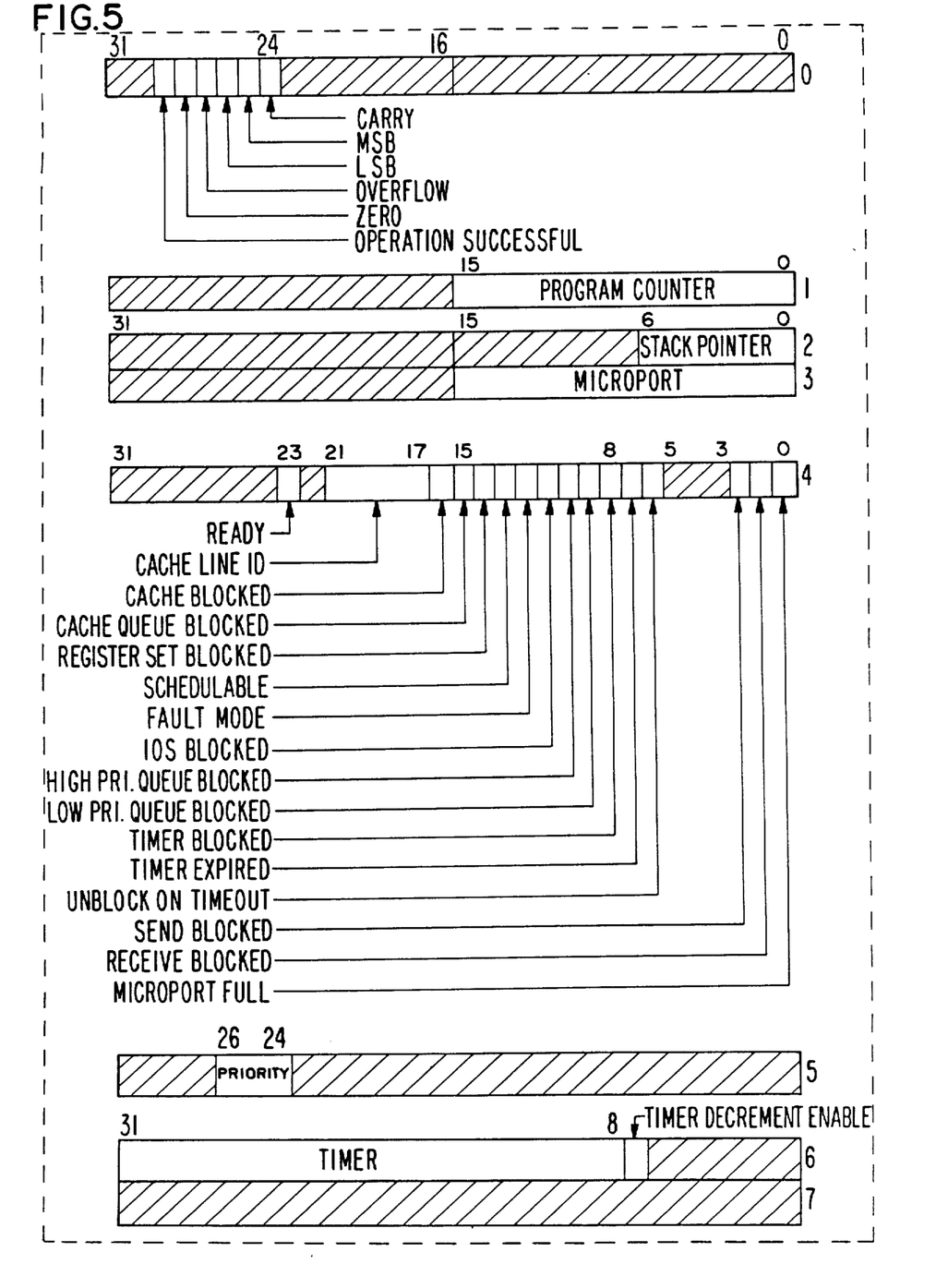
FIG. 5 is a diagram of task frame registers.

There are eight task frame registers corresponding to the eight resident tasks (25) shown in FIG. 1, and eight register set pointers in each task frame. The task frames of the eight resident tasks are located in the local register space, but there is enough instruction support that most tasks will never have to access information in the task frame using the ACCESS LOCAL instruction. For example, the receive instruction copies the microport field from the task frame into a general register.

Task Frame Registers

The layout of the task frame registers (0-7) is shown in FIG. 5. The fields in the task frame registers and their locations are as follows:

High Priority Queue Blocked—This bit is set when the task is blocked waiting for the two-deep high-priority queue at the Local bus sequencer to be popped.

Low Priority Queue Blocked—This bit is set when the task is blocked waiting for the two-deep low-priority queue at the Local bus sequencer to be popped.

Cache Blocked—This bit is set when the task has suffered a cache miss and is waiting for the line containing the missed instruction to be fetched.

Cache Index—This field contains the index of the cache line that the task is waiting for. This field gets set when the task has a cache miss and is used by the hardware to determine which task to unblock when a cache line is updated.

Cache Queue Blocked—This bit is set when a task has tried to fetch an instruction that is not in the cache and the cache queue is full. The bit will be reset when a position in the queue becomes available.

Carry—This bit is modified by flag-setting arithmetic operations and reflects whether or not the operation produced a carry out of the most significant bit.

Fault Mode—This flag is set by the hardware any time a hardware fault occurs or the exception instruction is executed. The bit can be cleared with the 'Set Status' instruction. If a fault occurs when this bit is set the fault will be reported as a 'multiple fault' fault.

IOS Blocked—This bit is set when a task executes an ACCESS or supply instruction and the target service table entry is locked. This bit is reset when any service table line is unlocked.

LSB—This bit is modified by most instructions that use the ALU. Its value is the same as the least significant bit of the result.

MSB—This bit is modified by most instructions that use the ALU. Its value is the same as the most significant bit of the result.

Microport Full—This bit is set by the hardware when it delivers a message to the microport. It is (optionally) cleared by the receive instruction.

Microport—This field is where inter-task communication messages are stored.

Operation Successful—This bit is modified by the Send and Receive instructions and indicates whether the instruction completed successfully.

Overflow—This bit is modified by flag-setting arithmetic operations and its value indicates whether or not a signed overflow occurred.

Priority—This field holds the priority level of the task. It is used by the hardware to determine relative priorities of tasks.

Program Counter—This register contains the current program counter for the task.

Ready—This bit is set if the current task is ready to execute. Ready to execute means that the task is schedulable and no block bits are set.

Receive Blocked—This bit indicates that the task is blocked waiting for a message in its microport. It gets set when the task executes a blocking receive instruction and its microport is empty. It is reset when a message is deposited in the microport.

Register Set Blocked—This bit is set when a task tries to access a register set through a register set pointer whose valid bit is reset. It is reset when the register set pointer is made valid.

Schedulable—This bit is used in conjunction with the various block bits to determine whether a task is ready to run.

Send Blocked—This bit indicates that the task is blocked waiting to deliver a message to a microport. It gets set when the task executes a blocking send instruction and the destination microport is full. It is reset when any microport is emptied.

Stack pointer—This field contains a logical address of a word in the register file. It is manipulated by the hardware when executing call and return instructions.

Timer Blocked—This bit indicates that the task is blocked waiting for the timer to expire. It is set by a blocking Timer Op instruction and is always reset when the timer expires.

Timer Expired—This bit is set when the timer value decrements to zero.

Top Of Stack—This field contains a copy of the top of the call stack. It is kept here and in the register set pointed to by the stack pointer. It is kept here to speed up returns. Returns can be excuted without having to make an inline access through the stack pointer to the register file. Updating of the Top Of Stack is done in parallel by the hardware during call and return instructions.

Unblock On Time Out—This bit is set when timed blocking sends or receives are executed and blocked. If the timer expires when this bit is set, the Send Blocked and the Receive Blocked bits will be reset. It is reset when the timer expires or when a send or receive instruction completes.

Zero—This bit is modified by flag-setting arithmetic operations and will be set if the result is zero.

Task Control

Figure 6:
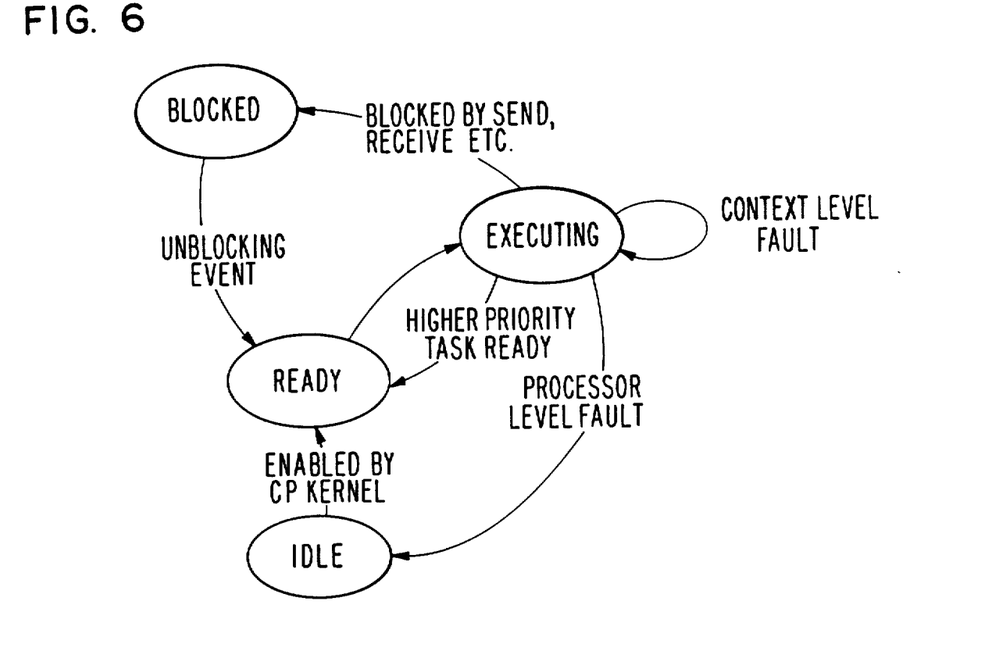
FIG. 6 is a state diagram of the operating states of the I/O processor.

Tasks reside in one of four states: idle, ready, executing, and blocked, as shown in FIG. 6. The sequencing of I/O Processor tasks is accomplished by hardware. An idle task cannot be scheduled by the hardware until microcode sets the schedulable flag in its task frame; it then enters the ready state and awaits execution by the EU. Once execution begins, the task enters the executing state. If the task ceases execution to await the completion of a blocking instruction (e.g., a microport operation), then it enters the blocked state; when an event occurs which unblocks the task, it returns to the ready state. If the task is preempted (see below), it reenters the ready state. A task only becomes idle again when its schedulable flag is reset or when a processor level fault occurs (see below). Ready tasks gain access to the EU based on their relative priorities; the EU implements fixed priority, preemptive scheduling. Thus a task is preempted only when a task of higher priority enters the ready state. Tasks of equal priority are served round-robin.

A task can block for two reasons:

—it tries to execute an instruction that is not in the instruction ROM or cache (i.e., a cache miss);

—it executes any instruction that causes it to block; this can occur on blocking sends (receives) to full (empty) microports, accessing locked register sets, etc.

Inter-Task Communication

The EU provides a simple message passing facility for Inter-Task Communication (ITC). A task sends a message to another task using the send instruction; the message is delivered to the microport register in the target task's task frame. A task can receive a message from its microport register using the receive instruction. The I/O bus sequencer can also deliver messages to tasks upon the completion of bus accesses. The microport holds one message. A task can elect to block when sending to a full microport or when receiving from an empty microport. It can also conditionally execute these operations (which means the instruction will not block and a flag tells if the operation was successful). Blocking for a specified period of time (and optionally raising an exception if the time limit is reached) if the operation cannot complete successfully can also be done. These options are selected using parameters to the send and receive instructions.

The microport operation makes use of several flags in the task frames, as follows:

—the port full flag is set whenever a send instruction to that task frame's microport is successful; it is reset whenever a receive instruction completes; if the flag is set, there is a message in the microport; if it is reset, there is not;

—the send blocked flag is set whenever the task executes a blocking send instruction and the destination microport already has a message in it; it will be reset when the destination microport becomes empty.

—the receive blocked flag is set whenever the task executes a receive instruction, there is no message in the microport, and the task elects to block if the microport is empty; this flag is reset whenever a message arrives at the microport;

—the operation successful flag is set when the send and receive instructions execute successfully, and reset when they do not; this is used to indicate the return status when the instructions are executed conditionally or when a time limit is specified. Microport messages are sixteen bits long, and have no predefined format when generated by the send instruction. Tasks usually set the most significant bit to zero in order to distinguish whether the message originates from a task or from a bus sequencer; all bus sequencer messages have a one in the most significant bit. The receive instruction allows the port full flag to be optionally cleared or left set when the instruction executes.

Timers

Each task has a task timer. This 24-bit decrementor can be used for any operations that are time dependent. Instruction support exists for loading, storing, starting and stopping the timer. The timer is also accessible in the local register space. The timer tick rate is every 8 clock cycles giving a granularity of ½ microsecond and a maximum timer period of 8 seconds. Each active timer decrements at the tick rate until the timer is stopped by the task or until it counts down to zero. When the timer expires (decrements past zero) the timer expired flag in the task's frame is set. The Timer Op instruction provides the means for loading, storing, starting and stopping the timer. It also allows a task to block until the timer expires.

Intertask register synchronization

The I/O Processor provides mechanisms for tasks to share register sets (for pipelined algorithms) while assuring that multiple tasks are not manipulating the same register set at the same time. These intertask register synchronization mechanisms provide the ability for tasks to pass register sets between themselves and allow the receiving task to wait until the register set is ready for it. There are two methods of task synchronization provided by the I/O Processor. They are register set based synchronization and message based synchronization. These mechanisms are described below. Tasks can pass register sets between themselves, either directly or through a bus sequencer. Passing a register set from one task to another directly means that control of the register set will transfer from the sending task to the destination task immediately. When a register set is passed between tasks through a bus sequencer, the bus sequencer will operate on the register set (either write to it or read from it) before giving control to the destination task. The methods for doing these two passing routes with different synchronization mechanisms are described below.

Register set based synchronization

Register set based synchronization is accomplished using the register set locking mechanism. If a task tries to access a register in a register set that is locked (i.e., the valid bit is reset in the register set pointer) then the task blocks until the valid bit is set. Valid bits get reset when a task passes a register set to another task. For example, when a task executes an access memory instruction it is passing the register set to another task by passing to that task the register set pointer, via the Local bus sequencer, so that the sequencer can either load it up or write it out. The task executing the instruction also tells the Local bus sequencer (via the ACCESS instruction) which task, and which register set pointer, to pass the register set to when the sequencer is done with it (the destination task and register set could be the same one that sourced the access request). When the instruction is executed the valid bit in the register set pointer of the sending task is reset (i.e., the register set is locked), and when the Local bus sequencer is done with the register set it updates the destination register set pointer and sets its valid bit.

All instructions that pass control of a register set from one task to another work in the manner described above. The destination task as well as the register set pointer in that task are given in the instruction. When the instruction executes, the sending task's register set is locked, and when the register set is passed to the destination task, the destination task's register set pointer is updated to point to the passed register set and it is unlocked. The Access instruction provides register set synchronization for register set passing through a bus sequencer. The move pointer instruction provides register set synchronization for direct passing of a register set between tasks. Register set based synchronization is the fastest way to do register set passing between two tasks. However it is limiting, because a task can wait for only one register set at a time. If a task wants to wait for any one of many register sets then message based synchronization must be used.

Message based sychronization

Message based synchronization is done using microports in the task frames. With this form of synchronization, the sending task informs the destination task that a register set is ready for it by depositing a message in the destination task's microport. The message deposited in the microport includes the physical address of the register set being passed and which register set pointer in the destination task is to be updated. Before issuing the SEND instruction, the sending task will have locked its register set (i.e., reset the valid bit in the register set pointer) using the MOVPTR instruction. After receiving the message the destination task can move the physical address into a register set pointer using the Move Pointer instruction to gain access to the register set. Also, one form of the Access instruction provides message based synchronization for register sets passing through the I/O bus sequencer.

There is no single instruction that passes a register set directly from one task to another using message based synchronization. Direct register set passing can be done as follows. The sending task builds a message that contains the register set pointer and logical register set of the destination. The physical address of the register set being passed is put in the message using the Move Pointer instruction, which locks the register set pointer in the sending task. The message is then sent to the destination task using the Send instruction. Message based synchronization allows a task to wait for any one of many register sets. This is useful for a task that is expecting to receive register sets from multiple tasks or when the order of register set arrival is not known. However, if a circular pipeline of register-set passing tasks exists, care must be taken to avoid potential deadlock conditions.

Stack Operations

The hardware supports a stack for each task. The stacks are located in the logical register space of the tasks. The stacks are accessed through the stack pointer which is located in word 2 of the tasks' task frame registers (FIG. 5). The stack pointer contains a logical address that points to a half word in the register file. Every entry on the stack is a half word. When a call instruction is executed, the stack pointer is decremented and the PC is pushed on to the stack. When a return occurs, the stack pointer is incremented. The stack can range over the entire logical register space of the task. The stack wraps around in the logical space of the task if the pointer is incremented or decremented beyond the range of logical addresses. The stack can be used to hold 16-bit values, such as fault handler addresses. The Push and Pop instructions move data between the register file and the stack updating the stack pointer appropriately. Typically the stack pointer will be initialized to point to the high end of the task's register space (i.e. the last half word in logical register set 7).

Instruction Set Architecture

The EU's instruction set is partitioned into the following groups:
 -register operation instructions.
 -flow control instructions.
 -memory and I/O ACCESS instructions.
 -task control instructions.
 -Inter-Task Communication instructions.
 -other instructions.

Register Operation Instructions

Register operation instructions include all instructions that use the ALU in manipulating register operands. These instructions perform an operation with the source and destination operands and place the result in the destination. ALU operations can be performed on 8, 16, and 32 bit quantities.

Arithmetic Op—This instruction performs arithmetic on its operands. These operations include add, subtract, multiply, compare, and shift right. Most operations can be performed using either signed or unsigned arithmetic.

Logical Op—This instruction performs logical operations on its operands. These operations include, AND, OR, XOR, etc.

Bit Op—This instruction provides two functions. The first is the ability to test, set, or clear any single bit within a byte operand. The second is the ability to perform an indivisible test-and-set operation on a bit, thus providing a binary semaphore to implement critical regions.

Load Literal—This instruction loads a 16 or 32 bit destination operand with a 16 bit value.

Flow Control Instructions

Flow control instructions are those that cause the instruction stream to branch.

Branch and Call—These instruction's target addresses are encoded in the instruction. The branches may be specified to be conditional, in which case the branch will occur only if the operation flags are set properly. Call instructions also cause the return address to be pushed on the task's call stack.

Case—This instruction's target address is computed at run-time. The instruction contains a base address, and the register operand contains an offset from that address. Case instructions always take the branch..

Return—This instruction causes a branch to the address contained in the top of the task's call stack.

Return from ICE—This instruction is identical to the return instruction except that the 'ICE mode' is reset as the return is executed.

Exception—This instruction is used to invoke the exception mechanism of the CP. Tasks are able to raise context level exceptions using this instruction. The instruction causes the task to branch to the 'software defined' fault branch address.

Debug Break—This instruction is the programmers way to enter ICE mode. The instruction has two modes, conditional and unconditional. Unconditional Debug Break always causes the I/O Processor to enter Processor Level Fault mode. Conditional Debug Break will cause the I/O Processor to enter ICE mode if the TRACE ENABLE flag is set.

Memory Reference Instructions

A task moves data between its register file and memory (either local or I/O bus) using the ACCESS instruction. This instruction will move from 1 to 16 bytes of data. The sending task can specify which task is to be notified when the operation is complete. The destination task can be notified using Register Set based synchronization or Message based synchronization. The SUPPLY variant of the ACCESS instruction is used for block moves on the I/O side.

Task Control Instructions

Task control instructions provide means for checking and controlling the status of a task.

Set Status—This instruction allows the 'schedulable' and 'fault mode' bits in a task frame to be set or reset. If the operation sets the 'fault mode' bit the selected task will also branch to the 'software raised' fault branch address.

Inter-Task Communication (ITC) Instructions

The Send and Receive instructions allow tasks to communicate between themselves. Communication is achieved by passing messages to tasks' microports.

Other Instructions NOP—The NOP instruction performs no operation and changes no state. It always executes in one cycle.

Push—This instruction pushes a value onto the stack. The value can either be a literal or a 16-bit value from the register file.

Pop—This instruction pops the top entry from the stack.

Access Tags—This instruction is used to manipulate the tag bits in the register file. The four tag bits in a register set (i.e., the 33rd bits of the four words in the register set) can be loaded (or stored) from (to) a half-byte specified in the instruction.

Timer Op—The Timer Op instruction controls the operations of a task's timer. It provides functions for loading, starting, stopping, and storing the timer. The instruction can also cause (optionally) the task to block until the timer expires.

Move Pointer—This instruction moves data between a task's register set pointers and the register file. It is primarily used in message based synchronization.

Access Local—This instruction provides the programmer access to the interconnect and local register space. It allows data to be moved between local registers and the register file.

Test Resource—This instruction finds the index of the most significant '1' in a byte. A 'test resource' executed on that byte will return a value that corresponds to the first available resource. It is useful for resource allocation, where each bit in a byte signifies the availability of some resource.

Load Cache—This instruction allows lines in the cache to be preloaded. The programmer specifies an address that should be in the cache, and the line containing that address will be fetched. The line containing the specified address can be optionally locked or unlocked.

Read Instruction—This instruction loads instructions into the register file. The programmer specifies the instruction address and a 32-bit destination register, and the instruction at that address will be put in the register file. This works for instructions that are in the ROM as well as external instructions. It is useful for component testing.

Addressing modes

Most instructions are constructed to have two operands, the source and the destination. All operands come from the register file. All instructions allow operands to be accessed indirectly.

The instructions contain operand specifiers that are of the form ISSSSSSS or IDDDDDDD. These operand specifiers can reference an operand in one of three ways, literal, direct or indirect. If the instruction designates a literal operand then the operand specifier will be used as an eight bit literal.

Direct operands have I=O and the rest of the field is interpreted as a logical address. Instruction that use word sized operands (4-bytes) must have the bottom two bits of the operand specifier equal to zero. Half-word operands must have the bottom bit equal to zero.

When an instruction has an indirect operand I=1, the operand in the instruction points to a byte in the register file that is the logical address of the operand. The format of the logical address in the register file is shown in the above-identified copending application Ser. No. 06/942,608.

Logical addresses used in indirection must always be halfword aligned if the M bit is one. If the M bit is a zero, then only the selected byte will be used as an address and the current task's register set pointers are assumed; otherwise the FFF bits tell which task's register set pointers to use when resolving the address. The RRR bits tell which register set pointer to use and the bottom four bits give the byte address within the register set.

Using indirect addressing with the M bit set to one is risky business. If the pointer that was used is not valid, the task whose pointer it was will be blocked, and the running task will continue, using a register set that has bad data, or the execution unit will hang up.

Instruction Cache Operation

The instruction cache holds 256 instructions. It does fully-associative address mapping, with 32 address blocks, 2 lines per block and 4 instructions per line. Each instruction is 28 bits wide, but when in main memory, it is placed in a 32 bit word with leading zeroes.

Management of the instruction cache is transparent to the tasks once the initial binding between the instruction segment in the CS memory and the cache has been completed. When a task has a cache miss, the task is blocked until the line containing the instruction is fetched from CS memory. Other tasks may execute during this time. When the cache line has been fetched, the task is unblocked.

Prefetch

Cache lines are prefetched using a strategy called 'tagged prefetch within an address block'. This means that the second line in an address block will be prefetched as soon as the first line has been accessed once.

Prefetch will not occur if the cache request queue (which is 3-deep) is full.

Line Locking

Certain applications may require that their code be completely in the cache and always available, before and while it is executed. Time critical transfer loops are an example. The Load Cache instruction allows a programmer to load a line containing a particular instruction and optionally lock it in the cache. The same instruction is used to unlock the line. Locked lines will not be replaced.

Data Flow Example

Figure 7:
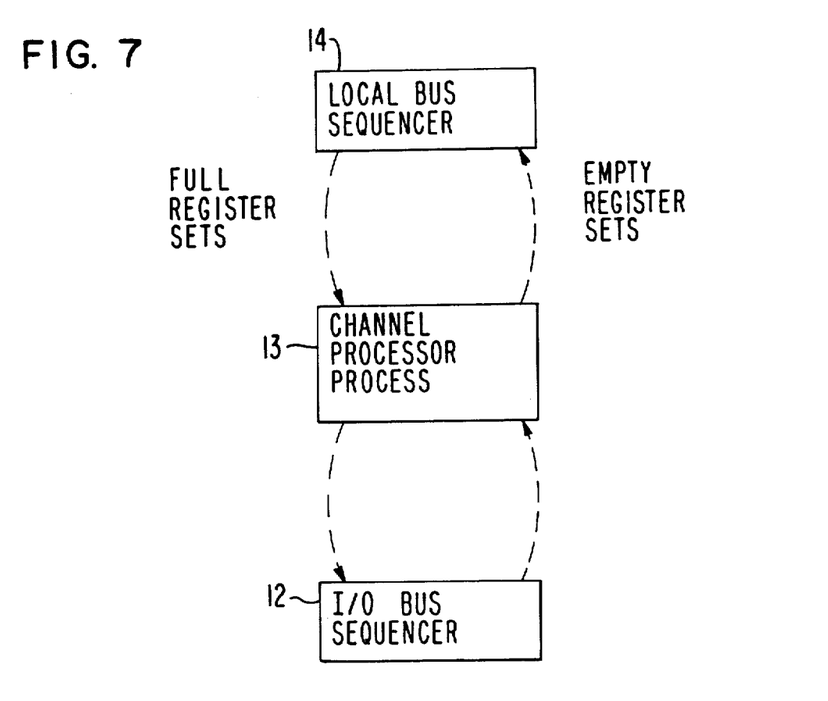
FIG. 7 is a diagram showing the data flow in the channel processor.

FIG. 7 is an illustration of data flow through the channel between the local bus sequencer (14) and the I/O bus sequencer (12), under control of a channel processor (13), assuming a pipeline consisting of two register sets-A and B. Upon entering this loop, both register sets are in the I/O bus sequencer (12). Register names in italics indicate blocking points. The following illustrates the flow:

```
loop:   ACCESS (register_A, local bus read, buffer_addr):
        data_length := data_length − 16;
        IF data_length ≦ 0 GO TO clean_up;
        buffer_addr := buffer_addr + 16
        check_sum := check_sum + 16;
        check_sum := check_sum + register_A;
```

-continued

```
check_sum := check_sum + register_A+4;
check_sum := check_sum + register_A+8;
check_sum := check_sum + register_A+12;
ACCESS (register_A, IOS-write, channel_addr);
ACCESS (register_B, local bus read, buffer_addr);
data_length := data_length - 16;
IF data_length ≦ 0 GO TO clean_up;
buffer_addr := buffer_addr + 16
check_sum := check_sum + 16;
check_sum := check_sum + register_B;
check_sum := check_sum + register_B+4;
check_sum := check_sum + register_B+8;
check_sum := check_sum + register_B+12;
ACCESS (register_B, IOS-write, channel_addr);
GO TO loop;
```

Local Bus Sequencer (LBS)

All communications and transfers to and from the system side of the I/O processor go through the local Bus Sequencer. This is used by both the EU and the cache.

Queuing Of LBS Requests

There are several mechanisms that control the use of the LBS (local bus Sequencer) by the EU and the cache. More detail about the execution unit can be found in the above-identified copending patent application Ser. No. 06/942,608.

Access requests to sytem memory are processed by the LBS. These requests are placed in one of two queues, the low-priority queue or the high-priority queue. The programmer specifies which queue by providing a channel number when he executes the ACCESS instruction. The low-priority queue is channel 14 and the high-priority queue is channel 15. Each of these queues is two deep, and as their names imply, any requests in the high-priority queue will be serviced before those in the low-priority queue.

If a request comes from the EU and is targeted for one of these queues, and the queue is full, the task will block and a task switch will occur. When the queue is popped by the LBS, all tasks blocked on the queue will unblock. Tasks blocked in this manner are guaranteed to gain access to the resource by the hardware scheduling mechanism. The order of service is round-robin among tasks of the same priority. Tasks with higher priority will be given access first.

Requests coming from the cache are generated either by a cache miss or a line prefetch. When a request comes from the cache the request is queued in the cache request queue. This queue is three deep and each entry can hold a request to fill a cache line. If the request is due to a cache miss, the task that caused the miss will be blocked and its Cache Blocked bit will be set. When the cache request is completed the task will be unblocked.

If the cache request queue is full and a task experiences a cache miss, the task is blocked and the Cache Queue Blocked bit is set. When any cache request is filled, the queue becomes available and all tasks that were blocked waiting for a slot will be unblocked. The task will then cause a cache miss again in order to get a cache request queued. No prefetches will be done if the cache request queue is full.

When the Local Bus becomes available and both the EU queues and cache queue are waiting, requests will be taken from the two in a round robin fashion.

Data Alignment Restrictions

There are several restrictions on making computational subsystem (CS) memory accesses. Memory requests that cross 16-byte boundaries in the computational subsystem memory space are not allowed. Also, all the data associated with the request must come from or be put into one register set.

All bytes read or written through the LBS must have the same alignment in memory as they do in the register file. This means that the lower two bits of the physical address in memory and the lower two bits of the register address must be the same.

The LBS and the ACCESS instruction

Any ACCESS instruction whose sequencer code is 14 or 15 will be directed to the LBS. 14 is the code for the low-priority channel and 15 is the code for the high-priority channel.

Interagent Communication (IAC) reception

The IOS has a special IAC request line that can be set up to allow the Channel Processor to receive IAC's. The line contains information about which task to notify (always task 7) when an IAC arrives, and how to reply to the reply task (always message-based synchronization).

The IAC request line is separate from other IOS lines and is hard-wired to reply to task number 7's microport when the IAC pin is triggered. The IAC channel is always enabled and valid. When an IAC is received, task 7 will be notified via its microport.

While the invention has been particularly shown and described with reference to preferred embodiments thereof, it will be understood by those skilled in the art that the foregoing and other changes in form and detail may be made therein without departing from the scope of the invention.

What is claimed is:

1. An I/O processor for controlling data transfer between a local bus and an I/O bus comprising:
   a register file (16);
   an Execution Unit (10) connected to said register file;
   said execution unit including a register mapper (24) for establishing a correspondence between logical addresses in instructions and physical addresses of said register file,
   a local bus sequencer (14) connected to said local bus and to said register file; and,
   an I/O bus sequencer (12) connected to said I/O bus and to said register file;
   said register file (16) being shared by said Execution Unit, said local bus sequencer, and said I/O bus sequencer,
   said register file being comprised of a plurality of register sets;
   each of said register sets being comprised of a number of local registers addressable by a physical address;
   said I/O bus sequencer (12), said local bus sequencer (14), and said Execution Unit (10) each having separate data paths for read/write access to said register file (16);
   said register mapper including a plurality of register set pointers, each register set pointer (FIG. 3) being stored at a location in said register mapper addressable by a logical address, said register set pointers being directly accessed by a logical address in an instruction executed by said execution unit in said I/O processor, each register set pointer having a physical address field for storing the physical address of one of said register sets in said register file such that said logical address presented at an input to said mapper selects a register set pointer, the physical address stored in said register set pointer thereby establishing the correspondence between said logical address and said physical address in said register file (16);

said Execution Unit including means for executing instructions that pass a register set pointer from a sending task to a destination task running on said processor by changing the contents of the physical address field of a register set pointer associated with said destination task;

said local bus sequencer (14) including first means responsive to said execution unit for sequencing data between said local bus and said register file;

said I/O bus sequencer including second means responsive to said execution unit for sequencing data between said I/O bus and said register file.

2. An I/O processor comprising:

an Execution Unit (EU-10) for executing a plurality of tasks comprised of a sequence of instructions;

said tasks including a sending task and a destination task;

a local bus sequencer (14) for providing a data path to an external memory connected to said I/O processor by a local bus;

an I/O bus sequencer (12) for providing a data path to external I/O devices connected to said I/O processor by an I/O bus; and,, a register file (16) connected to said EU, said local bus sequencer and to said I/O bus sequencer, said register file including a plurality of general-purpose registers, said registers being organized into groups of register sets, each register set being comprised of a number of registers addressable by a physical address;

said I/O bus sequencer (12), said local bus sequencer (14), and said Execution Unit (10) each having separate data paths for read/write access to said register file (16);

said Execution Unit (10) including means (24) for converting a logical address specified in an instruction to a physical address in said register file (16).

said converting means (24) including a plurality of register set pointers (FIG. 3), said register set pointers being directly accessed by logical addesses in instructions executed by said execution unit in said I/O processor, each register set pointer having a physical address field for storing the physical address of one of said register sets such that a logical address presented by an instruction selects a register set pointer, the physical address stored in said register set pointer being a physical address in said register file (16).

3. The combination in accordance with claim 1 wherein:

each of said tasks includes a task frame, each task frame including said register set pointers, and hardware specific state information usable by said EU for dynamically allocating said register sets to said sending and destination tasks.

4. The combination in accordance with claim 2 wherein each register set pointer includes a valid bit, means in said instructions of said sending task for writing the physical address in a register set pointer specified in said instruction into the register set pointer of said destination task and for setting the destination task's register set pointer valid bit and resetting the sending task's register set pointer valid bit.

5. The combination in accordance with claim 3 wherein each of said task frames includes a task frame register, said task frame register including a microport field for storing intertask communication messages, access instruction means in said instruction of said sending task for specifying a target task, receive instruction means in said instruction of said target task for accepting a message in said target task's microport; and, move pointer instruction means in said instruction of said target task for moving the register set pointer corresponding to said task frame register of said sending task to the task frame register of said target task to thereby map said register set into the logical space of said target task.

6. The combination in accordance with claim 3 wherein each of said register set pointers includes a valid bit, means in said instructions of said sending task for resetting the sending task's register set pointer valid bit, and means in said instructions of said destination task for setting the destination task's register set pointer valid bit, bit.

7. The combination in accordance with claim 3 wherein each of said task frames includes a task frame register, said task frame register including a microport field for storing intertask communication messages, access instruction means in said instruction of said sending task for specifying a target task, receive instruction means in said instruction of said target task for accepting a message in said target task's microport; and, move pointer instruction means in said instruction of said target task for moving the register set pointer corresponding to said task frame register of said sending task to the task frame register of said target task to thereby map said register set into the logical space of said target task.

8. The combination in accordance with claim 1 wherein said Execution Unit includes means for sequencing tasks through idle, ready, executing, and blocked states, said sequencing means comprising:

task-frame means for associating hardware specific-state information, each task frame being comprised of a plurality of task-frame registers, said plurality of register set pointers, and a plurality of flags including a schedulable flag, a send blocked flag and a receive blocked flag;

means for scheduling an idle task upon the condition that said schedulable flag is set, to thereby enter the task into the ready state, and means for halting execution of a task upon the condition that said send block flag or said receive block flag is set, to thereby enter the task into the blocked state.

* * * * *